US008194207B2

(12) United States Patent
Kim et al.

(10) Patent No.: US 8,194,207 B2
(45) Date of Patent: Jun. 5, 2012

(54) BACKLIGHT ASSEMBLY, LIQUID CRYSTAL DISPLAY HAVING THE SAME, AND MANUFACTURING METHOD THEREOF

(75) Inventors: Won-Ju Kim, Asan-si (KR); Jae-Hwan Chun, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 747 days.

(21) Appl. No.: 12/273,580

(22) Filed: Nov. 19, 2008

(65) Prior Publication Data

US 2009/0256988 A1 Oct. 15, 2009

(30) Foreign Application Priority Data

Apr. 11, 2008 (KR) ...................... 10-2008-00033716

(51) Int. Cl.
G02F 1/1333 (2006.01)
G02F 1/1335 (2006.01)
(52) U.S. Cl. ............................ 349/64; 349/58; 632/97.2
(58) Field of Classification Search ........ 362/97.1–97.3; 439/235; 349/62, 64, 58, 61
See application file for complete search history.

(56) References Cited

U.S. PATENT DOCUMENTS

| 7,322,734 | B2 | 1/2008 | Shai et al. |
| 2005/0276074 | A1* | 12/2005 | Ryu ............................... 362/613 |
| 2006/0103775 | A1* | 5/2006 | Chung ............................. 349/58 |
| 2006/0279536 | A1 | 12/2006 | Choi et al. |
| 2008/0024068 | A1* | 1/2008 | Cho et al. ....................... 315/161 |

* cited by examiner

Primary Examiner — Mark Robinson
Assistant Examiner — Michael Inadomi
(74) Attorney, Agent, or Firm — Cantor Colburn LLP

(57) ABSTRACT

A liquid crystal display ("LCD") with a backlight assembly includes a liquid crystal ("LC") panel displaying an image, a backlight assembly providing light to the LC panel, a middle frame disposed between the LC panel and the backlight assembly, and a top frame to complete the LCD assembly. The backlight assembly includes a plurality of light sources, an optical member, a bottom frame and a plurality of optical member supporters. The optical member supporters each support the optical member and are mutually spaced apart from each other to effectively dissipate heat and reduce the weight of the LCD.

20 Claims, 7 Drawing Sheets

BACKLIGHT ASSEMBLY, LIQUID CRYSTAL DISPLAY HAVING THE SAME, AND MANUFACTURING METHOD THEREOF

This application claims priority to Korean patent Application No. 2008-33716, filed on Apr. 11, 2008, and all the benefits accruing therefrom under 35 U.S.C. §119, and the contents of which in its entirety are herein incorporated by reference.

BACKGROUND OF THE INVENTION

1. Field of the Invention

The present invention relates to a backlight assembly, a liquid crystal display ("LCD") having the backlight assembly, and a manufacturing method thereof, and more particularly, the present invention relates to a backlight assembly having improved structure at a lateral part thereof, an LCD having the backlight assembly, and a manufacturing method of the LCD.

2. Description of the Related Art

As display devices are used in everyday life, the liquid crystal display ("LCD") has been gaining popularity The LCD has a liquid crystal ("LC") panel which includes a pair of opposing substrates with a liquid crystal layer therebetween. The LCD also has a backlight assembly since the liquid crystal layer is not self-emissive. The backlight assembly is located behind or below the LC panel to provide light to the liquid crystal layer.

The backlight assembly is classified into two groups according to the location of a light source, a direct light backlight assembly and an edge light backlight assembly. In the direct light backlight assembly, the light source is located behind the LC panel with at least one optical member therebetween to enhance the illumination uniformity and/or viewing angle.

The backlight assembly also requires a bottom frame for receiving light sources and supporting the optical member. Specifically, light emitting portions of the light sources are disposed on or above a light source receiving part of the bottom frame while heat emitting electrode portions of the light sources are covered by and hidden behind a side frame positioned at a lateral part of the light source receiving part of the bottom frame.

Here, each of the electrode portions of the light sources are almost fully enclosed by the side frame and each of the electrode portions of the light sources continuously radiate heat; hence, there would be excessive heat at lateral parts of the backlight assembly. The excessive heat is problematic because it may cause a fire on the side frame at the lateral part which is a safety concern.

To solve the disadvantage above, highly heat endurable material is used in manufacturing the side frame.

BRIEF SUMMARY OF THE INVENTION

It has been determined herein, according to the present invention, that adding more heat endurable material to a backlight assembly increases the expense of the side frame, thus increasing the total cost in manufacturing LCDs. In addition, as the side frame fully covers the edges of each of the light sources in the backlight assembly, there is a limitation in reducing the weight of the LCD having the backlight assembly.

Thus, it is an aspect of the present invention to provide a backlight assembly having improved structure at the lateral part thereof preventing excessive heat, reducing manufacturing cost and reducing the weight of the backlight assembly, such as by providing a backlight assembly having a separated optical member supporter between light sources.

It is a further aspect of the present invention to provide an LCD having the backlight assembly. It is a still further aspect of the present invention to provide a method of manufacturing the LCD having the backlight assembly.

According to exemplary embodiments of the present invention, a backlight assembly of an LCD includes a light source, an optical member, and a bottom frame. The light source is located behind a liquid crystal ("LC") panel to radiate light to the LC panel. The optical member is at least one of a diffusion plate, a diffusing sheet and a light collimating sheet to control light distribution by changing light direction.

The light source has a light emitting portion in a middle region of the light source and an electrode portion supplying electricity to the light source at an edge of the light source. The electrode portion also radiates heat since not all the electricity is converted to optical energy.

The bottom frame includes a main plane and a peripheral part. The main plane receives and is overlapped by the light sources with a middle portion. The main plane also has a marginal portion accommodating the electrode portion of the light sources. Meanwhile, the peripheral part is located adjacent the marginal portion of the main plane to support a middle frame on a flat surface of the peripheral part and to define the outer dimension of the backlight assembly.

In a vicinity of the peripheral part and on the marginal portion of the main plane, a plurality of optical member supporters supporting the optical member are installed with an interval therebetween. Specifically, each of the optical member supporters is located between neighboring electrode holders that hold the electrode part of the light sources. Since the peripheral part and the optical supporters are spaced apart, there is an empty space therebetween to effectively dissipate heat. Here, an optical member is located on an optical member receiving part of the optical member supporter and more specifically defines the empty space.

According to another exemplary embodiment of the invention, an LCD includes an LC panel, a middle frame, a top frame and a backlight assembly. The backlight assembly includes a light source, an optical member and a bottom frame which includes a main plane and a lateral part.

The lateral part of the bottom frame has a peripheral part which has an inner wall, a flat surface, and an outer wall. The inner wall is vertically bent from the main plane while the flat surface horizontally extends from the inner wall. In the meantime, the outer wall is bent from the flat surface to give mechanical strength to the back light assembly.

According to yet another exemplary embodiment of the invention, an LCD includes a backlight assembly having an optical member supporter discretely installed to a lateral part of a bottom frame. The optical member supporter supports an optical member with an optical member receiving part at an upper portion of the optical member supporter. The optical member supporter also supports a lateral light reflecting part with a slope that extends from the optical member receiving part to the main plane of the bottom frame.

According to still another exemplary embodiment of the invention, an LCD includes a backlight assembly having a plurality of optical member supporters. Each of the optical member supporters are interconnected to each other by a bridge at the upper portion of each of the optical member supporters. On the other hand, a plurality of bridges may be formed to reduce the total volume of the optical member supporters.

According to yet another exemplary embodiment of the invention, an LCD includes a backlight assembly having a plurality of optical member supporters. Each optical member supporter has a vertical post to support the optical member and a back support part behind the vertical post to support a middle frame which is located between the backlight assembly and an LC panel. With the back support of the optical member supporter, an empty space is formed to allow effective heat dissipation of the LCD.

According to still further exemplary embodiments of the present invention, a method for making an LCD includes providing a bottom frame, arranging a plurality of light sources on the bottom frame, fixing a plurality of optical member supporters to the bottom frame, wherein the optical member supporters are spaced apart from each other, placing an optical member onto the optical member supporters, disposing an LC panel over the optical member, and enclosing an edge of the LC panel with a top frame.

BRIEF DESCRIPTION OF THE DRAWINGS

The above and/or other aspects and advantages of the invention will become apparent and more readily appreciated from the following description of the exemplary embodiments, taken in conjunction with the accompanying drawings of which.

DETAILED DESCRIPTION OF THE INVENTION

Figure 1A:
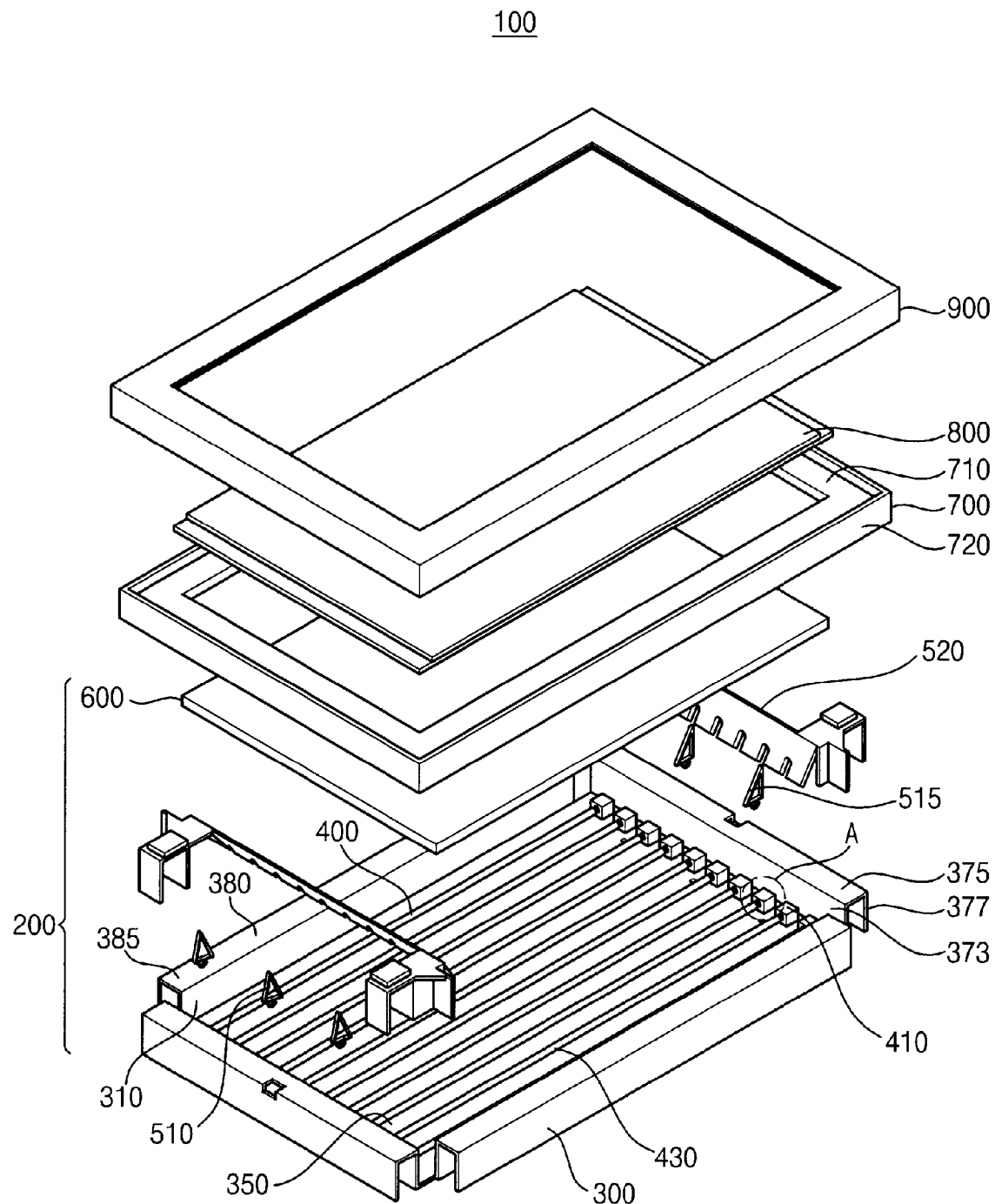
FIG. 1A is an exploded view of an exemplary LCD having spaced apart exemplary optical member supporters within an exemplary backlight assembly according to one exemplary embodiment of the invention.

Reference will now be made in detail to exemplary embodiments of the invention, examples of which are illustrated in the accompanying drawings, wherein like reference numerals refer to like elements throughout. The embodiments are described below in order to explain the invention by referring to the figures.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention. As used herein, the singular forms "a", "an" and "the" are intended to include the plural forms as well, unless the context clearly indicates otherwise.

It will be further understood that the terms "comprises" and/or "comprising" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "below," "beneath," "lower," "above," "upper," and the like, may be used herein for ease of description to describe one device or element's relationship to another device(s) or element(s) as illustrated in the drawings. It will be understood that the spatially relative terms are intended to encompass different orientations of the device in use or operation in addition to the orientation depicted in the drawings.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Hereinafter, the present invention will be explained in more detail with reference to the accompanying drawings.

Figure 1B:
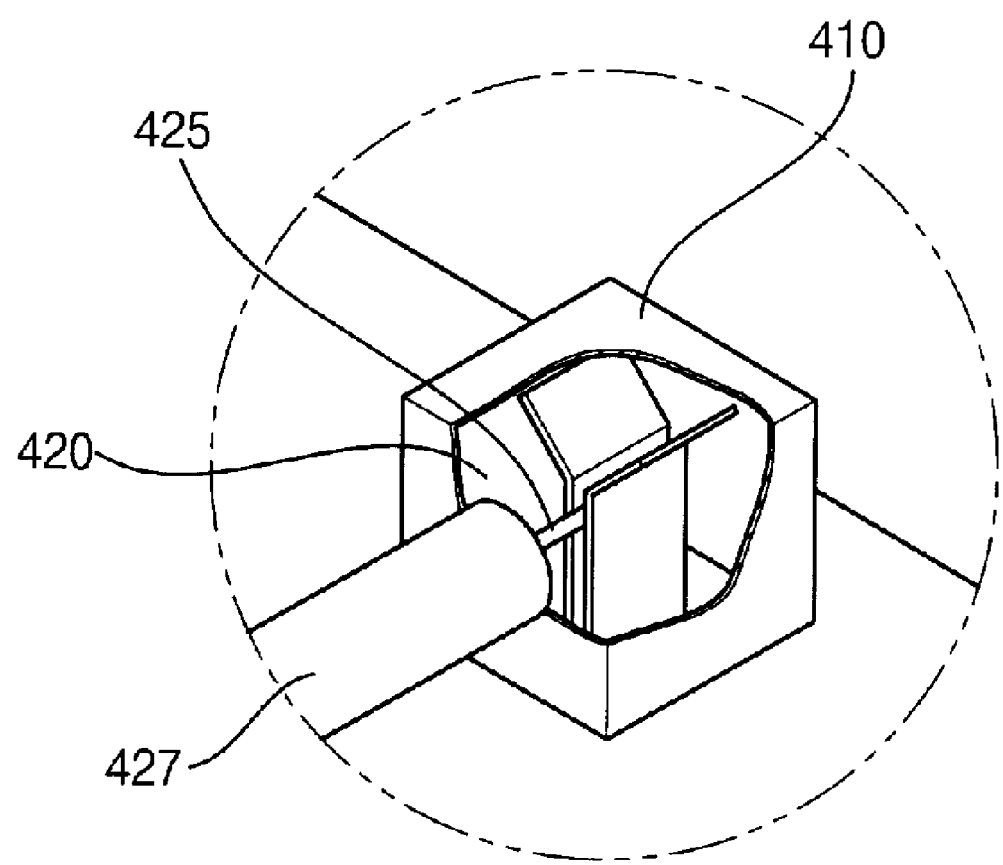
FIG. 1B is an enlarged perspective view of portion 'A' of FIG. 1A.

FIG. 1A is an exploded view of an exemplary LCD having spaced apart exemplary optical member supporters within an exemplary backlight assembly. FIG. 1B is an enlarged perspective view of portion 'A' of FIG. 1A.

Referring to FIGS. 1A and 1B, an LCD 100 includes a bottom frame 300, a plurality of light sources 400, an optical member 600, an optical member supporter 510, a middle frame 700, an LC panel 800 and a top frame 900. With respect to FIG. 1A, the light sources 400 are hereinafter described as fluorescent lamps, however it should be understood that the light sources 400 are not limited to fluorescent lamps. Rather, each light source may be understood as an apparatus emitting light in the middle portion and supplying electricity at edges.

Among the members of the LCD 100, the bottom frame 300, the fluorescent lamps 400, the optical member 600 and optical member supporter 510 are members of the backlight assembly 200 which generates and directs light for supplying sufficient luminance to LC panel 800.

Inside the backlight assembly 200, light is generated by a plurality of fluorescent lamps 400 which are received by a bottom frame 300; then, the light propagates through the optical member 600 which controls the light distribution for uniform and high luminance of the LC panel 800. Here, each fluorescent lamp 400 is installed to a main plane 350 of the bottom frame 300 with electrode portion 420 at the edge of the main plane 350 of the bottom frame 300. Specifically, the electrode portion 420 of the fluorescent lamp 400 has an electrode 425 for supplying electricity by being held by an electrode holder 410, as shown in FIG. 1B. The electrode portion 420 may also include an electrode holding glass part 427.

Meanwhile, the electrode portion 420 of the fluorescent lamp 400 generally operates at a high temperature since not all the electricity given to the electrode 425 is converted to optical energy. That is, the electricity given to the electrode 425 is converted to both optical and thermal energy. On the contrary, a light emitting portion 430, located in a central region of the fluorescent lamp 400, does not radiate as much heat as the electrode portion 420 of the fluorescent lamp 400.

Figure 3:
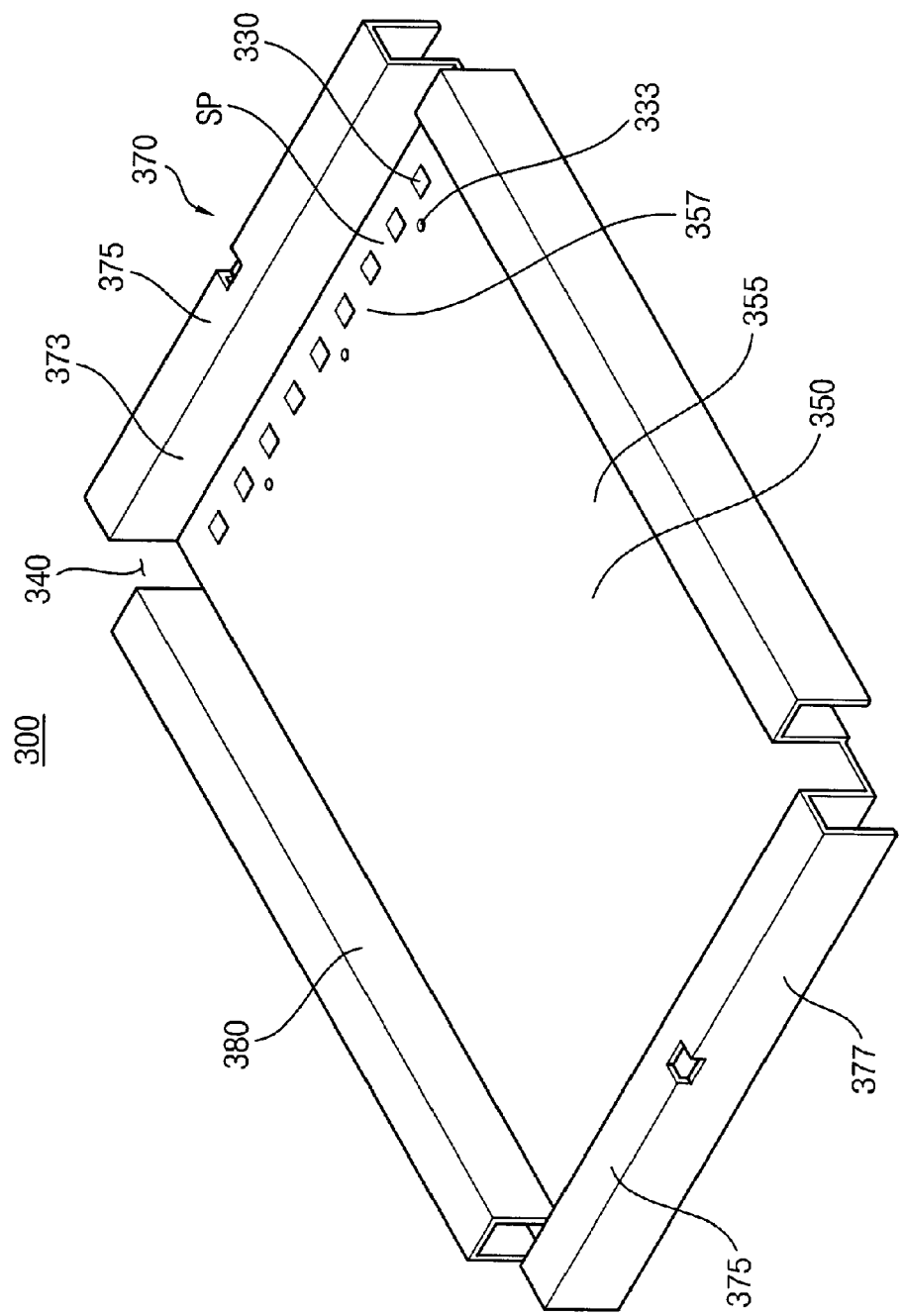
FIG. 3 is a perspective view of the bottom frame of FIG. 1A and 2A according to the invention.

The bottom frame 300 includes the main plane 350 and a peripheral part 370. The main plane 350 accommodates the plurality of fluorescent lamps 400 with both a middle portion 355 and an edge portion 357, as shown in FIG. 3. At the edge portion 357, the electrode 425 of the fluorescent lamp 400 is installed and connected to an outer electrical source (not shown) while the light emitting portion 430 of the fluorescent lamp 400 is above the middle portion 355 of the main plane 350 of the bottom frame 300.

In the meantime, the peripheral part 370 is vertically extended from the edge portion 357 of the main plane 350 with an inner wall 373. Then, the inner wall 373 is connected to a horizontally extended flat surface 375 that supports horizontal body 710 of the middle frame 700. The flat surface 375 may be substantially parallel to the main plane 350. Finally, the flat surface 375 is connected to a vertically extended outer wall 377 to face the vertical plane 720 of the middle frame 700. By having the inner wall 373, flat surface 375 and outer wall 377, the peripheral part 370 may have an 'n' shape to satisfy the mechanical strength and shock resistance of the LCD 100. Peripheral parts 370 maybe located on opposing lateral sides of the bottom frame 300.

In turn, the middle portion 355 of the main plane 350 of the bottom frame 300 extends outside and forms another 'n' shape side part 380 for supporting optical members 600 with an upper surface 385. Here, the side part 380 is parallel to the longitudinal direction of the fluorescent lamps 400. In addition, the side part 380 may be covered by a fluorescent lamp reflector 310 that is located and extended from beneath the light emitting portion 430 of the fluorescent lamps 400. Side parts 380 may be located on opposing longitudinal sides of the bottom frame 300.

As described above, the electrode 425 of the fluorescent lamp 400 is fixed to the main plane 350 of the bottom frame 300 via the electrode holder 410. Here, together with the electrode holder 410, the peripheral part 370 of the bottom frame 300 makes a lateral part of the backlight assembly 200. In the lateral part of backlight assembly 200, an optical member supporter 510 and a lateral light reflector 520 are also disposed.

Here, an empty space ES1 (FIG. 2A) above the electrode holder 410 is formed since the mutually spaced apart optical member supporters 510 are located between two neighboring electrode holders 410 while supporting a marginal area of the optical member 600. In detail, the empty space ES1 above the electrode holder 410 may expand until the empty space ES1 meets the middle frame 700 disposed on the flat surface 375 of the peripheral part 370.

In addition, more empty space ES1 next to the electrode holder 410 is present since not all the intermediate space of the electrode holders 410 is engaged by the optical member supporters 510. That is, each of the optical supporters 510 is spaced apart from each other with several electrode holders 410 therebetween.

After the optical member supporter 510 is fixed to the main plane 350 of the bottom frame 300, the lateral light reflector 520 covers a slope 512 of the optical member supporter 510 for reflecting the light emitted from the fluorescent lamps 400 to more specifically define the empty space ES1 around the electrode holders 410. At this point, the number of the optical member supporters 510 may be lessened as long as the lateral light reflector 520 maintains a flat surface even after the lateral light reflector 520 is installed.

With the empty space ES1 defined by the electrode holder 410, the optical member supporter 510, and lateral light reflector 520, the heat dissipation of the hot electrode holder 410 and the electrode portion 420 of the fluorescent lamps 400 might be easily accomplished.

After the fluorescent lamps 400, the optical member supporters 510, and the lateral light reflector 520 are installed to the bottom frame 300, the optical member 600 is disposed on the optical member supporter 510 to receive light emitted and reflected by the fluorescent lamps 400 and the reflectors 310, 520 respectively. Here, the optical member 600 may include any one or more of a non-flexible diffusing plate, a flexible diffusing sheet, a light collimating sheet and a reflection-polarization sheet. Specifically, a bottom side of an edge of the lowest optical member contacts both the optical member supporter 510 and side part 380; however, in an exemplary embodiment, the edge of the optical member 600 may not fully cover the space over the electrode holders 410 to allow open space over the electrode holders 410 and dissipate heat effectively.

The middle frame 700 covers the lateral parts of the backlight assembly 200 to isolate the lateral parts of the backlight assembly 200 from outer circumstances outside of the middle frame 700. The middle frame 700 includes a vertical plane 720 facing the outer wall 377 of the peripheral part 370 of the bottom frame 300 and a horizontal body 710 inwardly extending from the vertical plane 720. In addition, the horizontal body 710 defines the upper space over the electrode holder 410 of the lateral part of the backlight assembly 200. The middle frame 700 supports edges of the LC panel 800 and is covered by the top frame 900, the outermost part of the LCD 100.

Referring to FIG. 1A, an exemplary LCD manufacturing procedure of the present invention may also be described. Basically, the procedure is completed by finishing an assembly of the backlight assembly 200, disposing the middle frame 700 over the backlight assembly 200, placing the LC panel 800 over the middle frame 700, and placing the top frame 900 over the LC panel 800 to complete the LCD manufacturing process.

Among the procedure above, the assembling of the backlight assembly 200 is performed by placing the bottom frame 300, arranging a plurality of light sources 400 with the electrode holder 410 to the bottom frame 300, fixing the optical member supporter 510, covering the optical member supporter 510 with the lateral light reflector 520 while the lateral light reflector 520 is fixed onto the bottom frame 300, and placing the optical member 600 onto the optical member supporter 510.

Here, all the process may be accomplished by an automation process to save manufacturing cost. In the automation process, the individual optical member supporter 510 may be fixed in sequence or simultaneously. Alternatively some of the process may be accomplished by an automation process.

Figure 2A:
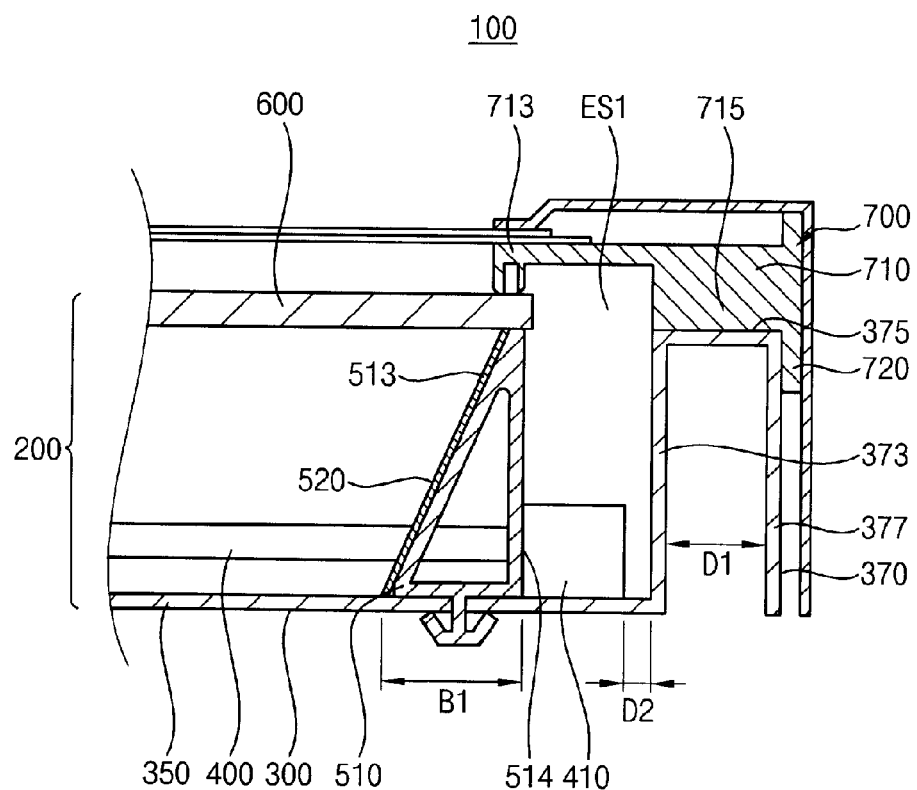
FIG. 2A is a cross-sectional view of the exemplary LCD of FIG. 1A having an empty space between the inner wall of the peripheral part of the bottom frame and the exemplary optical member supporter installed to the bottom frame according to the invention.

Now, the detailed configuration of the LCD 100 employing the empty space ES1 above the fluorescent lamp electrode portion 420 of the lateral part of the backlight assembly 200 is described. FIG. 2A is a cross-sectional view of the exemplary LCD of FIG. 1A having an empty space ES1 between the inner wall 373 of the peripheral part 370 of the bottom frame 300 and the optical member supporter 510 installed to the bottom frame 300.

Referring to FIG. 2A, the LCD 100 includes the backlight assembly 200, the middle frame 700, the LC panel 800, and the top frame 900. Among the members of the LCD 100, the backlight assembly 200 is designed to supply sufficient uniform luminance to the LC panel 800 by being placed behind the LC panel 800. The backlight assembly 200 and the LC panel 800 are spaced apart from each other by the horizontal body 710 of the middle frame 700 with an interposing part 713. The middle frame 700 may also include a plank portion 715 disposed on the flat surface 375 of the peripheral part 370 of the bottom frame 300.

Meanwhile, the flat surface 375 of the peripheral part 370 separates both inner 373 and outer walls 377 whose mutual distance is denoted as D1, where inner wall 373 and outer wall 377 are vertically bent with respect to flat surface 375. Here, the bottom frame 300 is made of metal such as aluminum, aluminum alloy, SECC (Steel, Electrogalvanized, Cold-rolled, Coil), or stainless steel. Because metal is superior in mechanical strength, the distance D1 between the inner and outer walls may be reduced as long as the mechanical strength, shock resistance and middle frame supporting width are satisfied. Furthermore, as the distance D1 decreases, the LCD 100 becomes increasingly compact.

In other aspects, the distance D1 between the inner wall 373 and the outer wall 377 may be longer than the distance D2 between the inner wall 373 and the electrode holder 410 since the effectiveness of heat dissipation would be improved as D2 decreases.

FIG. 2A also shows a fluorescent lamp 400 whose electrode 425 (FIG. 1B) is fixed to the electrode holder 410. The electrode holder 410 is connected to the bottom frame 300 at the inner space from the inner wall 373 of the peripheral part 370. That is, the electrode holder 410 is provided between the lamp 400 and the inner wall 373. Then, the optical member supporter 510 is located beside the electrode holder 410 to support the edge of the optical member 600 with an optical member receiving part 513. Here, the optical member supporter 510 is made of a plastic material so as not to hurt the surface of the optical member 600. Specifically, the edge of the optical member 600 is located in between the interposing part 713 of the middle frame 700 and the optical member receiving part 513 of the optical member supporter 510 to be fixed therebetween.

Meanwhile, on one side of the optical member supporter 510, a slope 512 is formed to receive the lateral light reflector 520. The side of the optical member supporter 510 having the slope 512 is the side of the optical member supporter 510 further away from the peripheral part 370. Here, since each of the optical member supporters 510 is mutually discrete and spaced apart from each other as described with respect to FIG. 1A, the lateral light reflector 520 may be adhered to the slope 512 by an adhesive (not shown) to maintain a flat surface throughout the whole surface of the lateral light reflector 520.

On the other hand, opposite the slope 512, a vertical post 514 is formed to give strength in supporting the optical member 600 and other parts above the optical member 600. The vertical post 514 is positioned between the slope 512 and the peripheral part 370. The vertical post 514 may be horizontally overlapped with the electrode holder 410 to minimize the space of the backlight assembly 200 and to make the LCD 100 compact.

With a cross-sectional view of the lateral part of the backlight assembly 200, there is an empty space ES1 defined by space between the electrode holder 410 and the middle frame 700. Alternatively, the empty space ES1 may be defined as the space between the inner wall 373 of the bottom frame 300 and the optical member supporter 510. In sum, the empty space ES1 may be enclosed by the inner wall 373 of the bottom frame 300, the horizontal body 710 of the middle frame 700, the optical member supporter 510, and the electrode holder 410 on the main plane 350 of the bottom frame 300.

Here, with the empty space ES1 over the electrode holder 410, heat dissipation may be easily achieved and the optical member supporter 510 of less heat resistant material may still satisfy the safety requirement of the LCD. Here, the safety requirement is directed to an inflammability which means the LCD 100 should be designed to resist flammability. Moreover, since the inner wall 373, made of metal, in the vicinity of the electrode holder 410 has high thermal conductivity, heat dissipation around the electrode holder 410 may be even more effective.

Figure 2B:
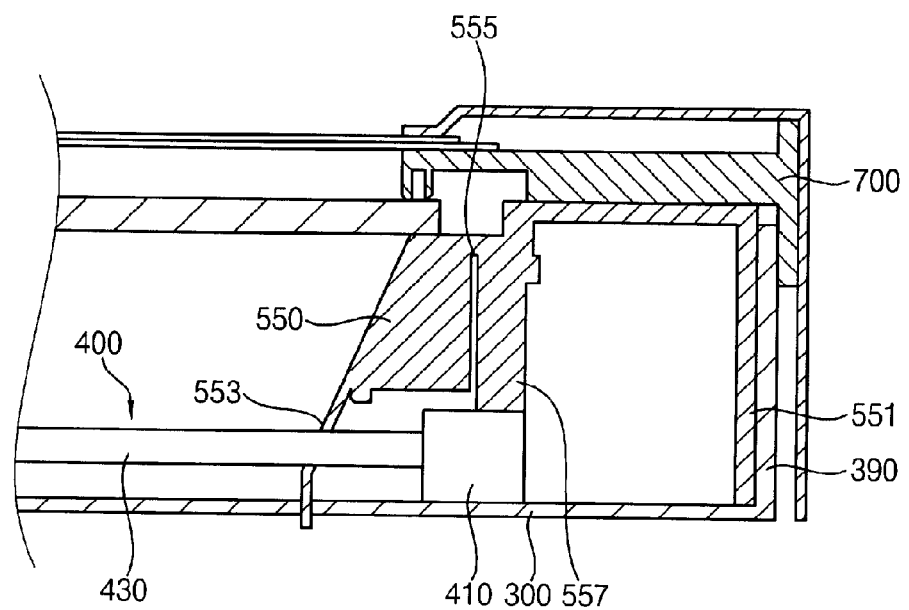
FIG. 2B is a comparative cross-sectional view of an LCD having no empty space above the electrode holder.

Now, the effectiveness of heat dissipation of FIG. 2A is described with a comparison to FIG. 2B. FIG. 2B is a cross-sectional view of an LCD having no empty space above an electrode holder. In FIG. 2B, unlike the lateral part having wide empty space ES1 above the electrode holder of FIG. 2A, the lateral part of FIG. 2B does not have a wide empty space above the electrode holder 410 blocked by the middle frame 700. In detail, the electrode holder 410 is surrounded by a bulky side frame 550 and a bottom frame 300. Here, the bottom frame 300 has a main plane 350 on which the electrode holder 410 is fixed and a vertical wall 390 bent from the main plane 350 in a distal position from the electrode holder 410.

Meanwhile, the side frame 550 has a first perpendicular wall 551 attached to the vertical wall 390 of the bottom frame 300, an inclined surface 553 located at the inner position from the electrode holder 410 to reflect light of the light emitting portion 430 of the fluorescent lamp 400, and a connector 555 linking the first perpendicular wall 551 and the inclined surface 553.

Further, the connector 555 may have a second perpendicular wall 557 extended downwardly from the middle of the connector 555 to the electrode holder 410. The second perpendicular wall 557 is also designed to give enough mechanical strength for supporting the middle frame 700 located on the connector 555.

Here, all the elements of the side frame 550 are unified; moreover, the whole body of the unified side frame 550 is continuously elongated from one of the side parts (not shown) to an opposite side part (not shown) which are extended in parallel with the fluorescent lamp 400. Hence, the air inside the side frame 550 is apt to be captured and may not easily flow out from the side frame 550. Thus, the temperature of the side frame 550, especially around the electrode holder 410, is very high.

Therefore, to avoid malfunction of the fluorescent lamp 400 and to lessen flammability of the side frame 550, the side frame 550 should be made of highly flame resistant or flame retardant material whose price is much higher than normal plastic material. Moreover, in a structural aspect, unlike FIG. 2A, since the vertical wall 390 is at a distal position from the electrode holder 410 and/or hidden behind the first perpendicular wall 551 of the side frame 550, the heat around the electrode holder 410 can not be transferred outside the vertical wall 390 of the bottom frame 300 easily.

Further, as the side frame 550 is unified and closely encloses the lateral part of the backlight assembly of FIG. 2B, the volume of the whole side frame 550 is considerably bigger than the optical member supporter 510 of FIG. 2A; hence, the cost of the backlight assembly adopting the bulky side frame 550 is higher than the backlight assembly of the present invention using lateral part of FIG. 2A.

In summary, referring to both FIG. 2A and FIG. 2B, the lateral part using an optical member supporter is superior to the lateral part using a side mold in cost and safety aspects.

FIG. 3 is a perspective view of the bottom frame described with respect to FIGS. 1A and 2A. Referring to FIG. 3, the bottom frame 300 is made from a metal such as aluminum, SECC (Steel Electrogalvanized Cold-rolled Coil), or stainless steel since those materials are highly conductive, resistive in thermal/electrical aspects and shock absorbent respectively.

Meanwhile, the bottom frame 300 is structured from a uniform thickness t single metal substrate which is bent and punched to have a suitable structure of the bottom frame 300. Here, since the original substrate has uniform thickness, the completed bottom frame 300 has a uniform thickness throughout the detailed structure of the bottom frame 300.

Now, the specific structure of the bottom frame 300 is described hereafter. In FIG. 3, the bottom frame 300 has a main plane 350 accommodating a plurality of fluorescent lamps 400 (FIG. 1A). At the edge of the main plane 350, the bottom frame 300 has a peripheral part 370 having an inner wall 373 upwardly bent from the main plane 350, a flat surface 375 horizontally stretched from the inner wall 373, and an outer wall 377 downwardly bent from the flat surface 375, such that a cross-section of the peripheral part substantially forms an upside-down "U" shape.

In the vicinity of the inner wall 373, a plurality of electrode holder fixing holes 330 are formed for installation of the electrode holders 410 (FIG. 1B). Here, the fixing holes 330 are arranged with a certain distance between neighboring fixing holes 330. Relative to some of the fixing holes 330, within the certain distance, an optical member supporter fixing hole 333 is formed for installation of the optical member supporter 510 (FIG. 2A). In detail, the optical member supporter fixing hole 333 may be located on the space SP relatively between two neighboring electrode holder fixing holes 330 or is inwardly located from the space SP between two neighboring electrode holder fixing holes 330.

Here, since the optical member supporter fixing holes 333 are mutually spaced apart from each other with several electrode holder fixing holes 330 therebetween, the number of the optical member supporter fixing holes 333 does not exceed the number of the electrode holder fixing holes 330. That is, there are less optical member supporter fixing holes 333 than electrode holder fixing holes 330.

Around the main plane 350 of the bottom frame 300, beside the peripheral part 370, there is a side part 380 which is vertical to the main plane 350 and parallel to the fluorescent lamp 400 (FIG. 1A). The peripheral parts 370 flank opposing lateral sides of the main plane 350, and the side parts 380 flank opposing longitudinal sides of the main plane 350. Here, between each of the peripheral parts 370 and each of the side parts 380, a plurality of corners 340 is formed. Since the bottom frame 300 is made from one flat substrate and both the side part 380 and peripheral part 370 are bent at different edges of the flat substrate, each of the corners has a gap between the side parts 380 and the peripheral part 370. In addition, the electrode holder fixing hole 330 at the marginal position of the plurality of electrode holder fixing holes 330 may be next to the gap of the corner 340 for easy installation of the electrode holder 410 (FIG. 1B) during the backlight assembly process.

Figure 4:
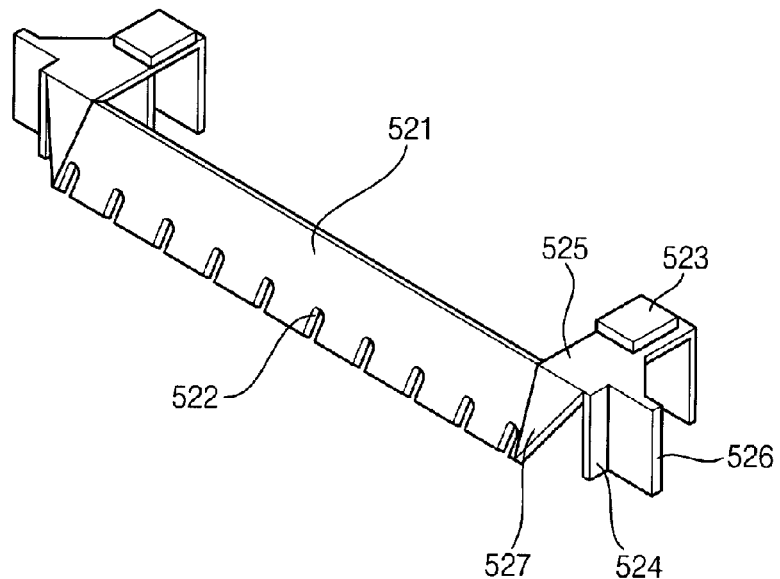
FIG. 4 is a perspective view of an exemplary lateral light reflector having a corner piece and an exemplary lateral light reflecting part according to another exemplary embodiment of the invention.

On the other hand, to block particles from the outer atmosphere of the backlight assembly 200 and give mechanical strength to the backlight assembly 200, a corner piece whose detailed structure is introduced in FIG. 4, is positioned at the corner 340 of the bottom frame 300.

Figure 5:
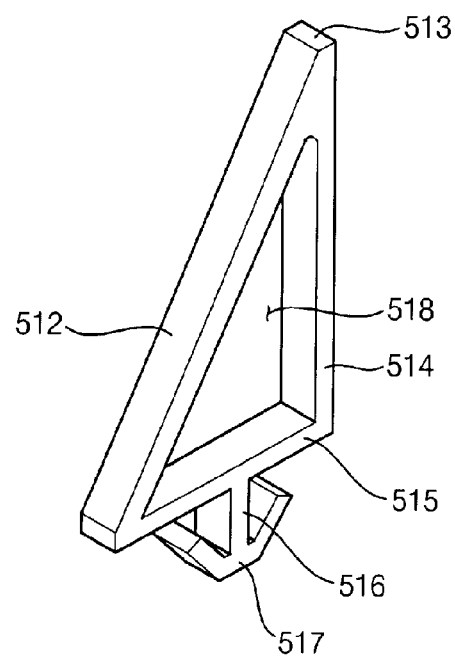
FIG. 5 is a perspective view of an exemplary optical member supporter fixable to a bottom frame according to yet another exemplary embodiment of the invention.

FIG. 4 is a schematic view of an exemplary lateral light reflector having a corner piece and a lateral light reflecting part. Referring to FIG. 4, corner pieces 523 are formed at end portions of the lateral light reflector 520 and a lateral light reflecting part 521 is formed between the corner pieces 523 to reflect light from the fluorescent lamp 400 (FIG. 1A) by being disposed onto the slope 512 of the optical member supporter 510 (FIG. 5).

Among the elements of the lateral light reflector 520, the corner piece 523 has a first vertical surface 524 which is located at the gap of the bottom frame 300 (FIG. 3) and an upper surface 525 to support a corner of the optical member 600 (FIG. 1A). Here, the first vertical surface 524 separates the inner space of the backlight assembly 200 from an outer atmosphere of the backlight assembly 200 by standing at the gap of the bottom frame 300 (FIG. 3).

For solid positioning of the first vertical surface 524, a second vertical surface 526 extended in another direction, such as a perpendicular direction, from the first vertical surface 524 is formed. Specifically, the second vertical surface 526 may be inserted into an inner-interval of the side part 380 of the bottom frame 300 (FIG. 3). Meanwhile, the upper surface 525 of the corner piece 523 is designed to support the corner of the optical member 600 (FIG. 1A).

The corner piece 523 may also have a slanted surface 527 for fixing an end part of the lateral light reflecting part 521. Specifically, the slanted surface 527 is extended from the upper surface 525 with a slope parallel to, or substantially parallel to, the lateral light reflecting part 521.

With the slanted surface 527 of the corner piece 523, the lateral light reflecting part 521 connects two corner pieces 523 while being disposed onto the slope of the optical member supporter 510 (FIG. 5). Since the lateral light reflecting part 521 is located between the electrode holder 410 and the main light emitting portion 430 of the fluorescent lamps 400 (FIG. 1A), a plurality of fluorescent lamp receiving openings 522 for accommodating each of the fluorescent lamps 400 of the backlight assembly 200 is formed. The fluorescent lamp receiving openings 522 may be grooves, such that the lateral light reflector 520 may be installed subsequent the lamps 400.

Here, to fully reflect the light of the fluorescent lamp 400, the fluorescent lamp receiving opening 522 tightly covers the glass of the fluorescent lamp 400 (FIG. 1A) with the lower part of the lateral light reflecting part 521; in addition, for full reflection with the lateral light reflecting part 521, the upper part of the lateral light reflecting part 521 extends upwardly until the upper part reaches the optical member 600 of the backlight assembly 200.

FIG. 5 is a perspective view of an exemplary optical member supporter fixable to a bottom frame. Referring to FIG. 5, the optical member supporter 510 has an optical member receiving part 513, a vertical post 514 and a slope 512. Among the elements, the optical member receiving part 513 supports an edge of the optical member 600 (FIG. 2) with a small flat surface. Then, the optical member receiving part 513 is sustained by the vertical post 514 which stands vertically from the main plane 350 of the bottom frame 300 (FIG. 2). At another direction from the optical member receiving part 513, the slope 512 is extended with an angle to the main plane 350 of the bottom frame 300 to receive the lateral light reflecting part 521 (FIG. 4).

The optical member supporter 510 may include an additional anchoring part 516 connecting the bottom portion of the vertical post 514 and the bottom portion of the slope 512 with a horizontal connector 515 and being fixed to the main plane 350 of the bottom frame 300 with an anchor 517. Specifically, the anchor 517 is inserted through the optical member supporter fixing hole 333 (FIG. 3) during the manufacturing of the backlight assembly 200.

As shown in FIG. 5, the whole structure of the optical member supporter 510 has an empty space 518 surrounded by the vertical post 514, the slope 512 and the horizontal connector 515 to reduce the cost of the optical member supporter 510 by limiting the amount of plastics used in manufacturing the optical member supporter 510; however, the empty space 518 may be filled at least partially as needed for mechanical strength with the optical member supporter 510.

As already described with respect to FIGS. 1 and 2A, because each of the optical member supporters 510 are fixed to the bottom frame 300 with a certain distance from each other, each of the optical member supporters 510 experiences less temperature between the electrode holders 410 than the unified side frame 550 of FIG. 2B. Thus, the material of the optical member supporter 510 would satisfy the safety requirement of the LCD 100 and would be cheaper than the material of the side frame 550 as well.

In addition, because the whole volume of the material of the optical member supporter 510 in one backlight assembly 200 is less than the whole volume of the material of the side frame 550 in one backlight assembly, the backlight assembly 200 using an optical member supporter 510 of the present invention would be manufactured with less cost than the backlight assembly using the side frame 550 of FIG. 2B.

Figure 6A:
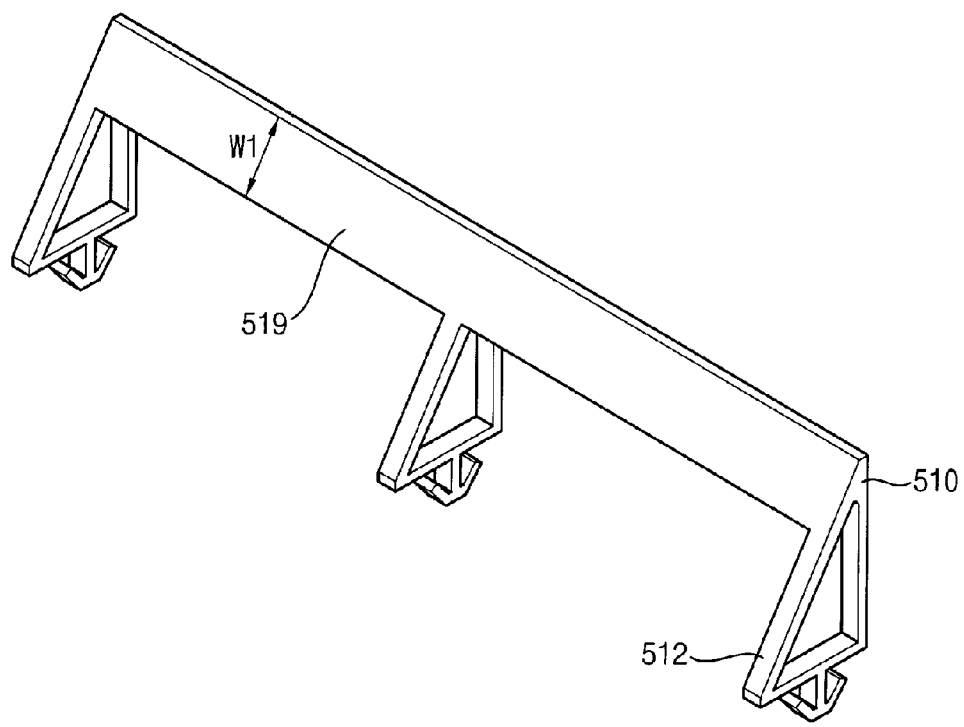
FIG. 6A is a perspective view of an exemplary optical member supporter whose upper portion is interconnected by a bridge according to still another exemplary embodiment of the invention.
Figure 6B:
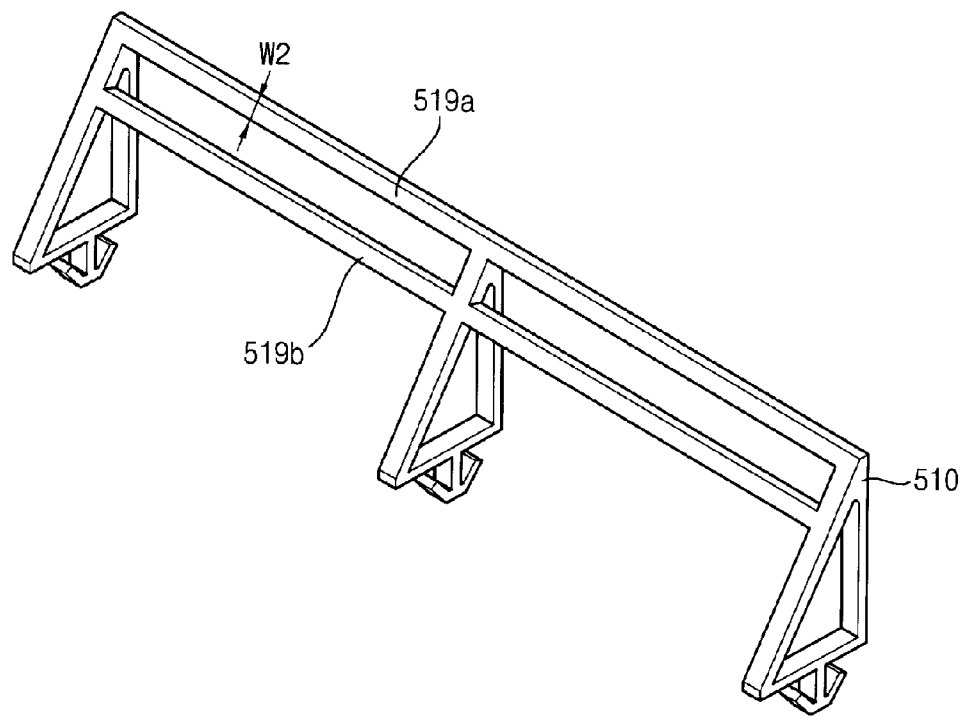
FIG. 6B is a perspective view of an exemplary optical member supporter whose upper portion and middle portion are interconnected by bridges according to another exemplary embodiment of the invention.

FIGS. 6A and 6B are perspective views of exemplary optical member supporters whose upper portions are interconnected by a bridge. Referring to FIGS. 6A and 6B, the individual unit of the optical member supporter 510 is substantially the same as the optical member supporter 510 of FIG. 5. As shown FIG. 6A, instead of standing alone, the neighboring optical member supporters are interconnected to each other by a bridge 519. Here, the bridge 519 may be located on the upper portion of the slope 512 of the optical member supporter 510 with a width of W1.

Alternatively, as shown in FIG. 6B, a first bridge 519a may be located on the upper portion of the slope 512 of the optical member supporter 510 with a narrower width, W2, than the bridge 519 of FIG. 6A and a second bridge 519b may be located on the middle portion of the slope 512 of the optical member supporter 510.

In both FIGS. 6A and 6B, the bridges bind the individual optical member supporters 510 to make the assembling process easy by unifying assembly members of several individual parts. However, with the bridged structure, the backlight assembly 200 still permits an empty space on or above the electrode holder 410 shown in FIG. 2A and heat emitting from the electrode part 420 of the lateral part of the backlight assembly 200 may be dissipated easily.

Figure 7:
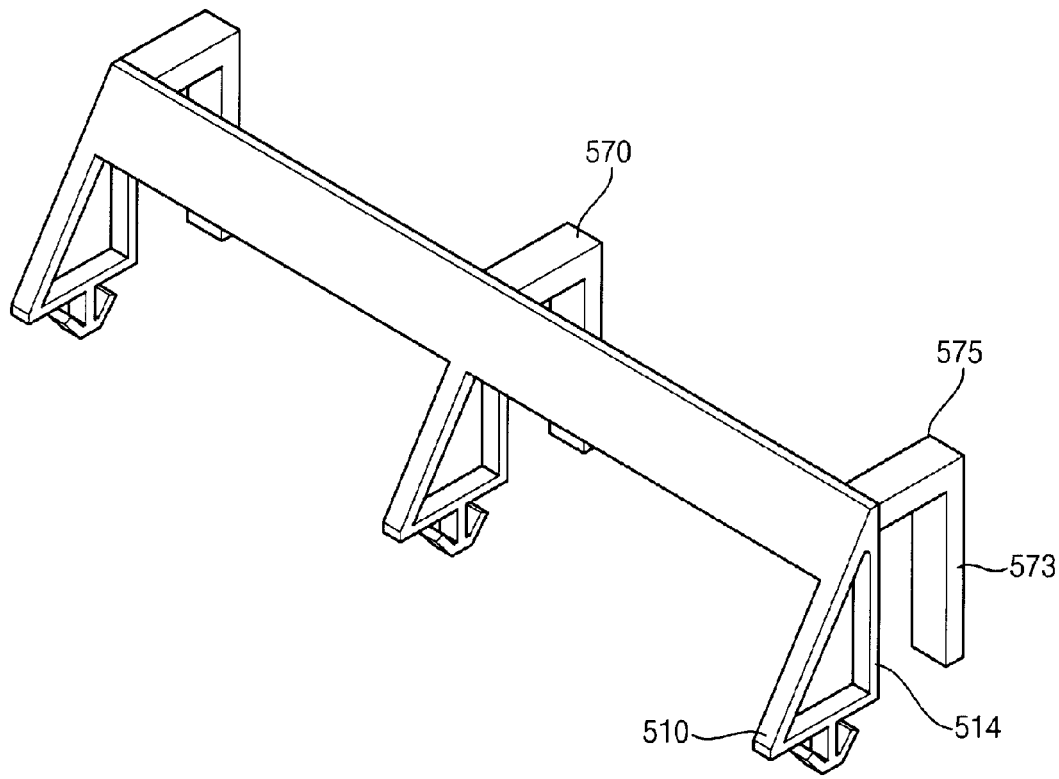
FIG. 7 is a perspective view of an exemplary optical member supporter with a back support part behind a vertical post of the exemplary optical member supporter according to yet another exemplary embodiment of the invention.

FIG. 7 is a perspective view of an exemplary optical member supporter with a back support part behind a vertical post of the exemplary optical member supporter. Referring to FIG. 7, the optical member supporter 510 has substantially the same configuration as FIGS. 5 through 6B except for a back support part 570 attached to the upper portion of the vertical post 514 of the optical member supporter 510.

The back support part 570 has a main supporter 573 vertically formed behind the vertical post 514 while a coupling supporter 575 connects a top of the main supporter 573 and a top of the vertical post 514 of the optical member supporter 510. The main supporter 573 and the vertical post 514 may be parallel or substantially parallel to each other. Here, on the main supporter 573 and the coupling support 575, the middle frame 700 (FIG. 8) may be positioned while the optical member 600 (FIG. 8) is positioned on the coupling support 575.

Figure 8:
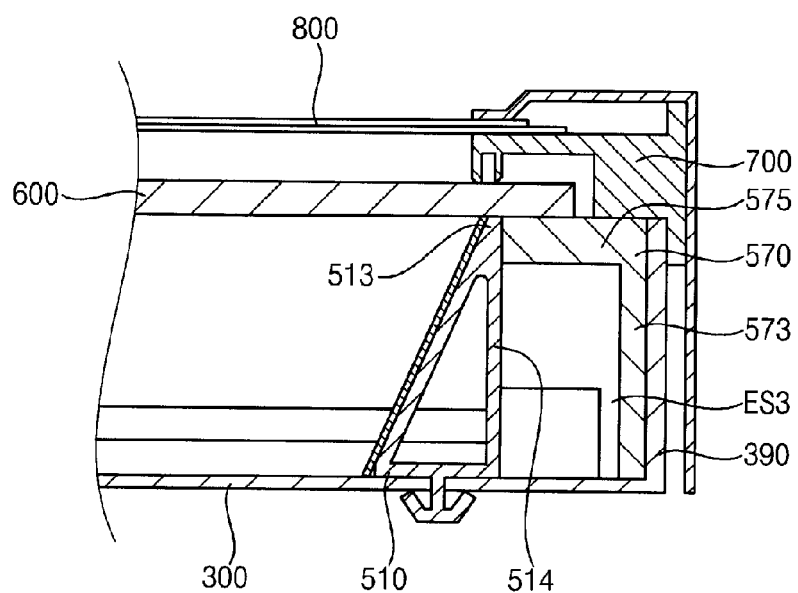
FIG. 8 is a cross-sectional view of an exemplary backlight assembly employing the exemplary optical member supporter having a back support part behind a vertical post of the exemplary optical member supporter of FIG. 7 according to the invention.

FIG. 8 is a cross-sectional view of an exemplary backlight assembly employing the exemplary optical member supporter having a back support part behind a vertical post of the exemplary optical member supporter of FIG. 7. Referring to FIG. 8, the optical member supporter 510 has the back support part 570 having the main supporter 573 supporting the middle frame 700 and the coupling part 575 supporting the optical member 600. The middle frame 700 may further be supported by an outer side portion of the coupling part 575. Here, the optical member 600 may be extended beyond the LC panel 800 and supported by both the optical member receiving part 513 and the coupling part 575 so as to be sufficiently supported.

On the other hand, the middle frame 700 is supported by the main supporter 573 standing next to a vertical wall 390 of the bottom frame 300. With respect to the vertical wall 390 of the bottom frame 300, unlike the dual vertical structure of the bottom frame 300 of FIG. 2A, FIG. 8 shows a singular vertical wall 390 since the back support part 570 supports the middle frame 700 with the main supporter 573. Here, with the main supporter 573 and vertical wall 390 of the bottom frame 300, still empty space ES3 is provided for effective heat dissipation. In addition, as the combination of the main supporter 573 and the vertical wall 390 supports the middle frame 700 effectively, the compactness of the LCD 100 maybe accomplished.

The above-described embodiments of the present invention are merely meant to be illustrative and not limiting. It will thus be obvious to those skilled in the art that various changes and modifications may be made without departing from this invention in its broader aspects. Therefore, the appended claims encompass all such changes and modifications as fall within the true spirit and scope of this invention.

What is claimed is:
1. A backlight assembly, comprising:
a plurality of light sources each having a light emitting portion and an electrode portion;
a bottom frame receiving the light sources;
an optical member located over the light sources;
a plurality of electrode holders holding the electrode portion of each of the light sources; and
a plurality of optical member supporters supporting the optical member, wherein each of the optical member supporters is spaced apart from each other,
wherein each of the optical member supporters comprises a vertical post, a slope angled to the vertical post and a connector connecting a lower portion of the slope and a lower portion of the vertical post.

2. The backlight assembly of claim 1, wherein each of the electrode holders is spaced apart and wherein each of the optical member supporters is located between two neighboring electrode holders.

3. The backlight assembly of claim 2, wherein the bottom frame has a main plane receiving both the optical member and the electrode holders.

4. The backlight assembly of claim 2, wherein the bottom frame has a main plane receiving both the optical member and the electrode holders, and wherein at least one of the optical member supporters is located closer to a middle portion of the main plane than at least one of the electrode holders.

5. The backlight assembly of claim 1, wherein the bottom frame comprises a main plane and a peripheral part at a marginal area of the main plane, wherein each of the optical member supporters is located on the main plane and forms a first empty space with the peripheral part in a horizontal direction.

6. The backlight assembly of claim 5, wherein the peripheral part of the bottom frame comprises a flat surface supporting a middle frame positioned on the backlight assembly, wherein the middle frame holds the optical member with the optical member supporter and forms a second empty space in a vertical direction with the electrode holder fixed to the main plane of the bottom frame.

7. The backlight assembly of claim 5, wherein the peripheral part of the bottom frame further comprises an inner wall vertically extended from a flat surface and forming the first empty space with the optical member supporter.

8. The backlight assembly of claim 7, wherein the peripheral part further comprises an outer wall vertically extended from the flat surface at an opposite side of the inner wall, wherein a distance between the inner wall and the outer wall is longer than a distance between the electrode holders and the inner wall.

9. The backlight assembly of claim 1, wherein each of the optical member supporters comprises a vertical post and a slope having a predetermined angle with the vertical post.

10. The backlight assembly of claim 9, further comprising a lateral light reflector disposed on the slope of the optical member supporters.

11. The backlight assembly of the claim 1, wherein the bottom frame comprises a main plane, a peripheral part vertically extended from a marginal area of the main plane in a vicinity of the electrode holders and a side part vertically extended from another marginal area other than the vicinity of the electrode holders.

12. The backlight assembly of clam 11, wherein the peripheral part and the side part form a gap at a corner of the bottom frame.

13. The backlight assembly of clam 12, further comprising a corner piece, wherein the corner piece is placed at the gap of the corner of the bottom frame.

14. The backlight assembly of claim 13, wherein each of the optical member supporters comprises a vertical post supporting the optical member and a slope having a predetermined angle with the vertical post member, wherein the corner piece is connected to a lateral light reflector, the lateral light reflector disposed on the slope.

15. The backlight assembly of claim 1, wherein each of the optical member supporters further comprises an anchor attached to the connector and being inserted through an optical member supporter fixing hole of the bottom frame.

16. The backlight assembly of claim 1, wherein neighboring optical member supporters are interconnected by a bridge.

17. The backlight assembly of claim 16, wherein the bridge is formed in plural.

18. The backlight assembly of claim 1, wherein each of the optical member supporters comprises a vertical post supporting the optical member, a slope angled to the vertical post, and a back support part disposed at an opposite side of the slope.

19. The backlight assembly of claim 18, wherein the back support part of the optical member supporter comprises a main supporter for supporting a middle frame and a coupling part connecting the main supporter and the vertical post of the optical member supporter.

20. A liquid crystal display comprising:
a liquid crystal panel displaying an image;
a backlight assembly providing light to the liquid crystal panel;
a middle frame disposed between the LC panel and the backlight assembly; and
a top frame enclosing the liquid crystal panel;
wherein the backlight assembly comprises
a plurality of light sources each having a light emitting portion and an electrode portion;
a bottom frame receiving the light sources;
an optical member located over the light sources;
a plurality of electrode holders holding the electrode portion of each of the light sources; and
a plurality of optical member supporters supporting the optical member, each of the optical member supporters being spaced apart from each other,
wherein each of the optical member supporters comprises a vertical post, a slope angled to the vertical post and a connector connecting a lower portion of the slope and a lower portion of the vertical post.

* * * * *